April 28, 1942.　　　D. GABOR　　　2,281,280
LIGHT RELAY
Filed May 10, 1940　　　4 Sheets-Sheet 1
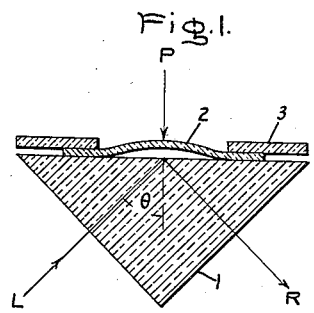
Fig.1.
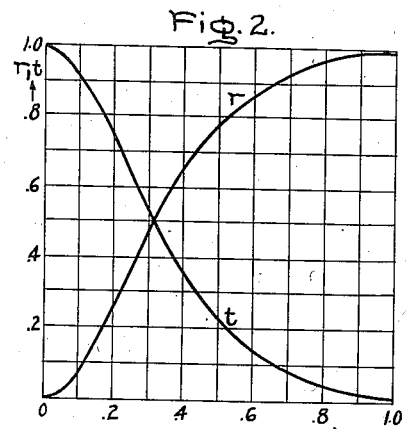
Fig.2.
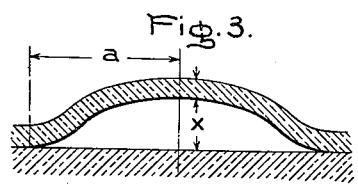
Fig.3.　　Fig.4.
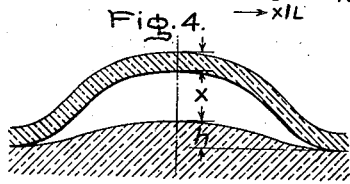
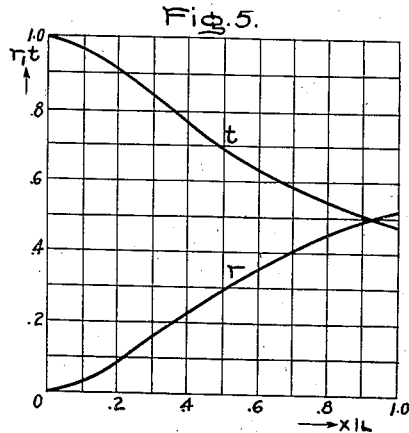
Fig.5.　　Fig.6.
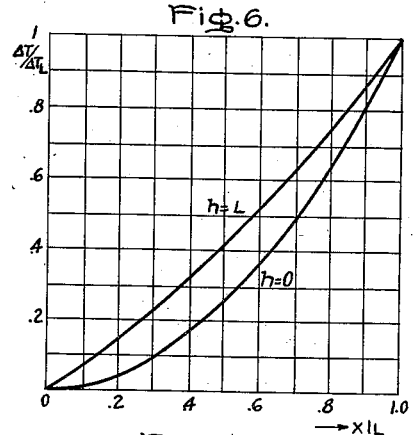
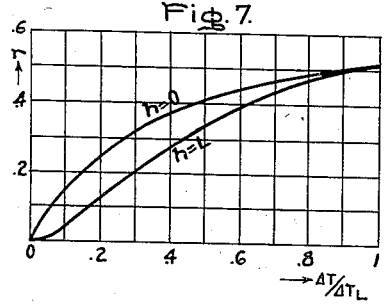
Fig.7.　　Fig.8.
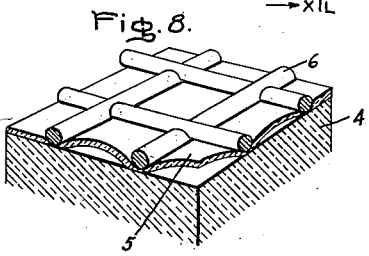
Inventor:
Dennis Gabor,
by Harry E. Dunham
His Attorney.

April 28, 1942.  D. GABOR  2,281,280
LIGHT RELAY
Filed May 10, 1940  4 Sheets-Sheet 2
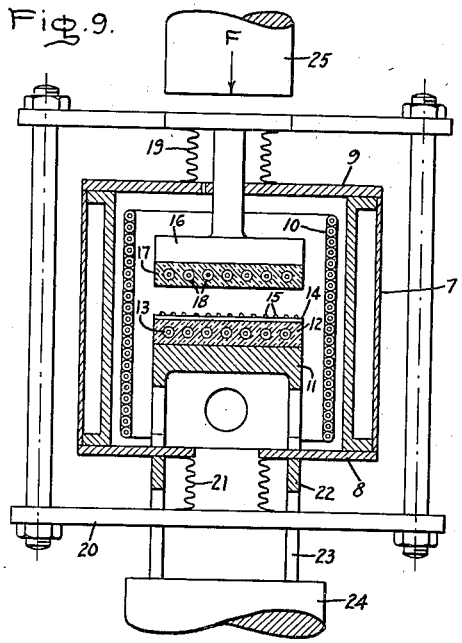
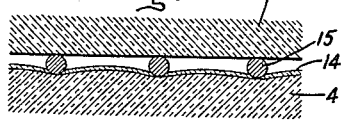
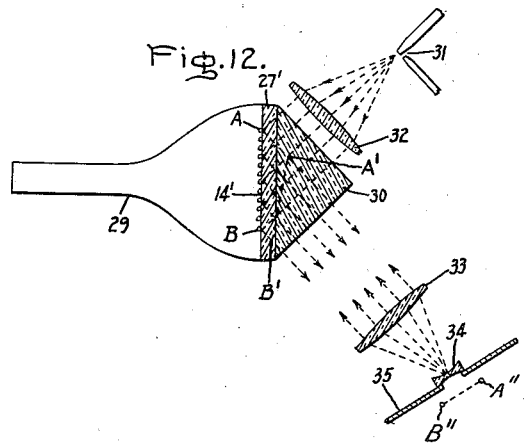
Inventor:
Dennis Gabor,
by Harry E. Dunham
His Attorney.

April 28, 1942.    D. GABOR    2,281,280
LIGHT RELAY
Filed May 10, 1940    4 Sheets-Sheet 3
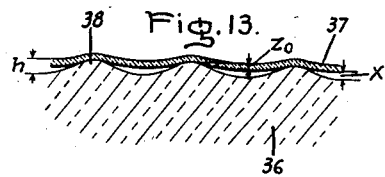
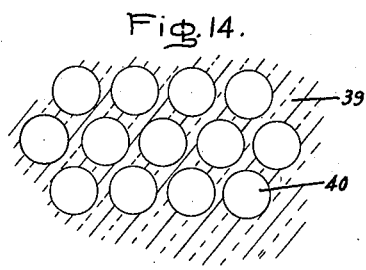
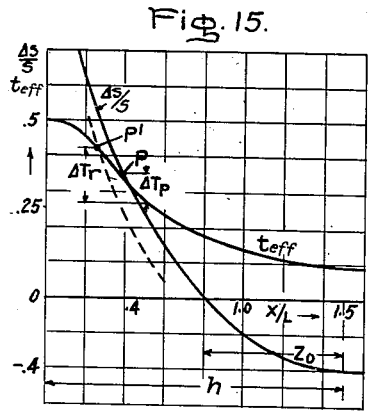
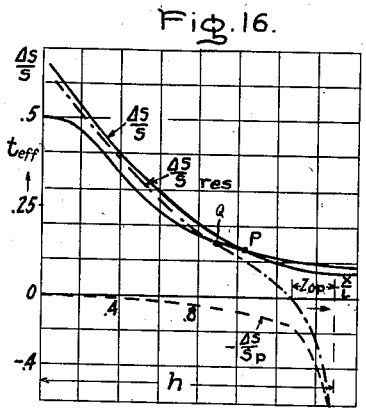
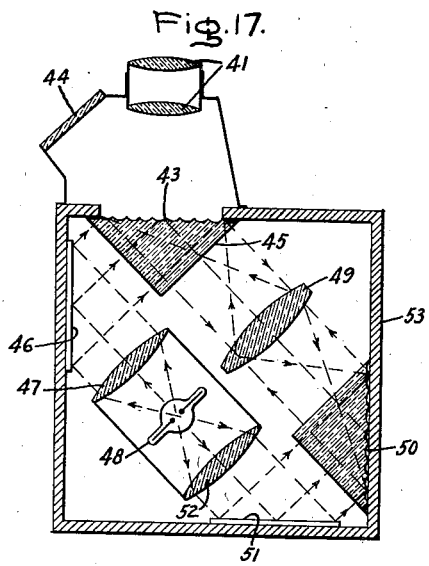
Inventor:
Dennis Gabor,
by Harry E. Dunham
His Attorney.

April 28, 1942.　　　D. GABOR　　　2,281,280
LIGHT RELAY
Filed May 10, 1940　　　4 Sheets-Sheet 4
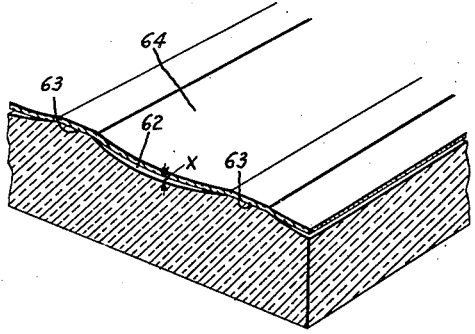
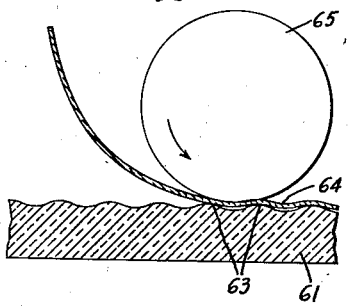
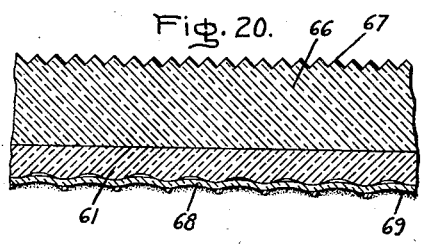
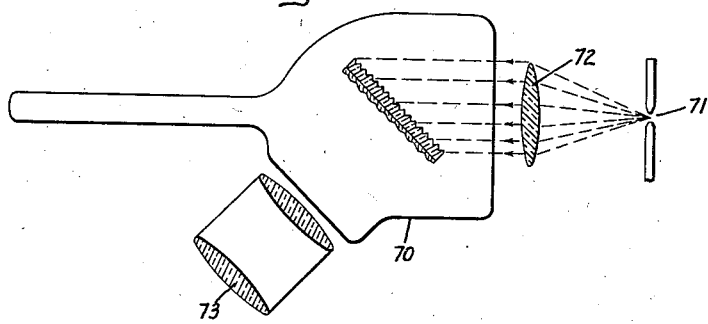
Inventor:
Dennis Gabor,
by Harry E. Dunham
His Attorney.

Patented Apr. 28, 1942

2,281,280

UNITED STATES PATENT OFFICE 2,281,280

LIGHT RELAY

Dennis Gabor, Rugby, England, assignor to General Electric Company, a corporation of New York Application May 10, 1940, Serial No. 334,441
In Great Britain May 24, 1939

8 Claims. (Cl. 250—164)

This invention relates to a new method of producing optical effects by small movements, which movements in turn may be caused by mechanical or electrical forces or—preferably—by heat. In particular it relates to a relay in which the energy of a radiation—to be called "primary radiation"—which may be undulatory or corpuscular, is converted into heat, and movements caused by said absorbed heat are used for modulating the intensity of a second or auxiliary radiation, arriving at said relay from an auxiliary source. More particularly the invention relates to one or two dimensional arrays of individual relays—the latter to be called "relay screens"—by means of which an image produced on said array or screen by the primary radiation is converted into an intensified image produced by the second or auxiliary radiation.

Each individual relay according to the invention consists in the combination of a fixed and of a movable element, separated from one another by a gap of the order of one wave-length or less of the auxiliary radiation. Both elements have substantially equal or not very different refractive indices for the auxiliary radiation. Said radiation is projected on to said gap through the fixed element, and arrives at the interface under an angle of incidence exceeding the angle of total reflexion.

The basic principle of the operation of this device is as follows. Under the conditions as above specified total reflexion will occur if the gap substantially exceeds one wave length of the auxiliary radiation. If however the two elements are further approached and finally brought into optical contact (i. e. contact such that no measurable space exists between the elements), total reflexion changes into total transmission within a movement of about one wave length. This extremely sensitive physical process is utilized on the devices according to the invention.

In a preferred embodiment of the invention the movable elements consist of a thin film, which may be common to a number or all of the elements forming an array or screen. This film is connected to the fixed element, to be called the base plate, in such a way as to allow small variations of the gap between them. In the case of arrays or screens, mechanical and thermal contact is established between film and base in points or lines forming a regular pattern or network. This device may be used for converting mechanical or electric forces acting on the movable parts of the film into optical effects. A single element may be used in certain cases, as for the recording of sound, whereas a multi-element screen may be used for converting images produced by sound waves into optical images.

In the case of images produced by electromagnetic or corpuscular—e. g. electronic—radiation, the conversion into visible images—or ultraviolet images, suitable for photographic recording—is effected preferably by making use of the heat produced by the absorption of the primary radiation. The flexible film is made of material absorbing for the primary radiation, and the temperature differences caused by said heat energy inside the film but particularly between the film and the base are used for producing distortions of the film, causing variation of the gap between them, and by this causing modulation of the auxiliary light by means of the total reflection effect above described.

The last described embodiments of the invention have many applications, of which two may be mentioned by preference. One application is the production of large screen television pictures. The relay screen takes the place of the fluorescent screen in a cathode ray tube. A primary image is produced on it electron-optically, and is converted into a very strongly intensified picture by visible auxiliary radiation. A second application is as image converter, either for intensifying a visible image, or for converting an invisible image into a visible picture. A particularly important application is the converting of infra red images.

The invention will be better understood with reference to the accompanying drawings which show preferred embodiments of the invention.

Fig. 1 of the accompanying drawings is a simple device for demonstrating and explaining the basic idea of the invention. Fig. 2 is a diagram of the optical properties of very narrow gaps. Figs. 3 and 4 show the shape of relay elements. Fig. 5 illustrates the optical properties of elements as shown in Figs. 3 and 4, and Fig. 6 shows the distortion of said elements under the influence of temperature differences. Fig. 7 shows the modulating characteristics of such elements as a function of temperature differences. Fig. 8 is a part of a relay screen. Fig. 9 is a device for manufacturing the same. Figs. 10 and 11 illustrate particular forms of relay screens. Fig. 12 shows the application of relay screens to projection television. Fig. 13 is a relay screen in which amplification is enhanced by the reaction of the auxiliary radiation. Fig. 14 illustrates the manufacture of said screen. Figs. 15 and 16 are diagrams showing the amplification by reaction. Fig. 17 is an image amplifier or converter of invisible images according to the invention. Fig. 18 represents an alternative form of the relay screen surface. Fig. 19 illustrates a method for making the screen of Fig. 18. Fig. 20 illustrates an improvement of the screen of Fig. 18. Fig. 21 shows the application of the screen of Fig. 20 to a particular use.

Fig. 1 shows a particularly simple application of the principle of the invention. On the hypothenuse of a rectangular prism 1, which represents the base plate or body, is placed a piece of thin glass film 2, which constitutes the movable element. The prism and/or the film may also be made of non-vitreous materials, such as transparent plastics. The film is clamped down by means of an apertured plate 3. Primary radiation P falls on the film from above, whereas the gap is irradiated with substantially parallel light L under an incidence angle $\theta$ exceeding the angle of total reflection. R is the reflected auxiliary radiation.

The film 1 must be absorbing for the primary radiation and it must be either transparent or diffusing for the auxiliary radiation. If it is made of transparent material, it must be roughened on its outer face; otherwise, the light penetrating through the gap into the film will be reflected from its outer face and variation of the gap will have no effect. The base 1 must be transparent for the auxiliary radiation, and it may be absorbing or transparent for the primary radiation. If it is transparent it is possible to operate the device by letting the primary radiation fall on the gap from the same side as the auxiliary radiation, but in this case the sensitivity of the device is reduced. Prism and film must have preferably the same refractive index. Equality is assumed in the following quantitative explanations, it being understood that this represents the optimum case, from which considerable departures are possible without departing from the spirit of the invention.

If primary radiation falls on the film, it is heated up to a higher temperature than the base 1 to which it is clamped. Consequently it expands and buckles, as shown in Fig. 1. The following Figures 2–7 allow quantitative explanation of the processes involved.

Fig. 2 is a graph, showing in a characteristic case the reflection and transmission coefficients $r$ and $t$ of an air gap of the width $x$ between two bodies of the same refractive index $n$, as a function of $x/1$, 1 being the wave length of the radiation. The general formula is as follows:

$$t = 1 - r = 1/\left\{\cosh^2 \times x + \left(\frac{1}{k} - k\right)^2 \sinh^2 \times x\right\} \quad \text{Eq. 1}$$

where $$\alpha = \frac{2\pi}{1}\sqrt{n^2 \sin^2\theta - 1} \quad \text{Eq. 2}$$

and $$k = \frac{n}{\cos\theta}\sqrt{n^2 \sin^2\theta - 1} \quad \text{Eq. 3}$$

The graph in Fig. 2 has been calculated for the case $n=1.55$, $\theta=45°$. It can be seen that within about one wave length there is a change from complete transmission to almost complete reflection, i. e. a movement of one wave length effects full modulation of the auxiliary light.

The curves in Fig. 2 cannot be immediately applied to a clamped sheet or film as shown in Fig. 1 or in Fig. 3, as different elements have different separations. The effect of the inclination is so small as to be altogether negligible.

Fig. 5 shows the averaged transmission and reflection coefficients of such an element, calculated for the case of a circular film clamped rigidly at the outer periphery with the radius $a$. The same graph applies also to elements as shown in Fig. 4, in which the base plate is also dished and has—at least approximately the same shape as the expanding film. This is necessary in order to establish perfect optical contact at zero primary radiation (i. e. in the normal condition of the film). Elements as shown in Fig. 4 are preferable to elements with flat base plate as shown in Fig. 3 for the reason that the flat state is semistable, the film may as well buckle inwards or outwards.

It can be seen from Fig. 5 that the modulation is less steep than in the case of the parallel gap, in the case of one wavelength separation at the centre the reflection is only 51% instead of 98.5%. This is however more than sufficient in view of the large energy amplification inherent in the new device.

The buckling of circular clamped films under the influence of temperature differences $\Delta T$ between film and base is shown in Fig. 6. The ordinates are $\Delta T/\Delta T_L$, i. e. the temperature differences are expressed as fractions of the difference $\Delta T_L$ which produces in the center of the film a gap $x$ equal to one wavelength L. This is plotted against $x/L$, i. e. the gap expressed in wavelengths. The shape of this curve depends on the initial, stress-free position of the film. The curve $h=0$ corresponds to an initially flat film, and the curve $h=L$ to a film which initially had a maximum elevation of one wavelength (Fig. 4). The first curve is a parabola, whereas the second approaches a straight line.

The temperature difference $\Delta T_L$ which produces a gap of L is given by the following equation $$\Delta T_L = \frac{C}{\alpha}\left(\frac{L}{a}\right)^2\left(1 + 2\frac{h}{L}\right) \quad \text{Eq. 4}$$

Here C is a numerical constant, which depends on the rigidity of the clamping and is about 3.25 for rigidly clamped films. $\alpha$ is the linear coefficient of thermal expansion, and $a$ is the radius of the film. In the case of unequal temperature distribution over the film $\Delta T_L$ is the average temperature which produces a gap L in the center.

*Example.*—If the film is made of ordinary soft glass $\alpha = 9.10^{-6}/°$ C., let $a = 0.125$ mm., $L = 5.89 \times 10^{-4}$ mm., which is the wavelength of the yellow sodium D-line. This gives $\Delta T_L = 7.8°$ C. for $h=0$ and 23.5° for $h=L$.

Combination of the graphs in Figs. 5 and 6 enables us to construct the modulating characteristics. In Fig. 7 the reflection coefficient $r$ is plotted over $\Delta T/\Delta T_L$, which in turn is a measure of the intensity of the primary radiation. It may be seen that especially the curve for an initially slightly dished film, $h=L$, has a very convenient shape and can be considered as almost linear over a fairly wide range.

The amplification factor of such a device may be defined as the ratio of the modulated auxiliary intensity to the modulating primary intensity. In the case of a film which is absorbing for both radiations this factor is obviously of the order one, as in this case the auxiliary radiation also tends to make the film buckle, and this effect decreases as the film buckles under the influence of the primary radiation, as with increasing gap less and less auxiliary radiation gets absorbed. The reaction of the auxiliary radiation is therefore in this case of such a sign as to decrease the sensitivity. Later another arrangement will be described in which the reaction has the opposite sign, and the absorption of auxiliary energy is turned into an advantage. In the case of a film which is absorbing for the primary radiation but only diffusing for the auxiliary energy there is no such limitation for the amplification factor.

Apart from the above defined energy amplification we may define a "useful amplification factor" as the ratio of visual—or e. g. photographic—effect of the modulated auxiliary radiation to the same effect of the modulating primary radiation. This can be made a very high number. If for instance the primary radiation is infra red with more than about $2.10^{-3}$ mm. wavelength, the visual, photographic or photoelectric effect of this radiation is nil, whereas the auxiliary radiation can be made purely visible, or e. g. ultraviolet light, with very great visual or photographic or photoelectric efficiency.

The following figures illustrate certain applications of the above principles to two-dimensional arrays of elements as described, or relay screens. These applications are chosen only by way of examples, it being understood that the principles are capable of many ways of realization.

Fig. 8 shows part of a relay screen which consists essentially of elements as shown in Figs. 1 and 3. In this Figure 4 is the base, which may be a plane polished glass plate. 5 is a thin film, made of suitable material, absorbing, diffusing or roughened. This is held down and clamped to the base 4 by means of a foraminated member 6, which may be a metal gauze, preferably rolled or flattened. Every mesh of said gauze forms a picture element, analogous to the one described in connection with Fig. 1. It is assumed that in the absence of differential heating between film and base the film lies flat on the base, in or almost in optical contact with it.

This relay screen may be manufactured, for example, by a device as shown schematically in Fig. 9. This is a vacuum furnace with a cooling jacket 7 and endplates 8 and 9. It contains a cylindrical heating element 10. The lower endplate 8 carries a strong plane table 11. On this is placed a polished plate 12 containing a heating body 13. This plate 12 is made of a material which is porous and not easily wetted by soft glass, such as e. g. graphite, cast iron or sintered tungsten, or a suitable ceramic material. On this plate is placed a thin glass film 14, and on top of this a gauze 15. Above this is held at a distance a piston 16, which is also fitted with a porous plate 17 with heating bodies 18. The piston is introduced into the vacuum through the metal bellows 19. This is connected through the frame 20 with a compensating bellows 21 of equal area, which ensures that there is no pressure on the piston when the furnace is evacuated. The furnace is placed by means of a ring 22 with openings 23 for the frame 20 on the anvil 24 of a hydraulic press.

The operations are as follows. The furnace is evacuated, and the temperature raised to a point above the transformation but well below the melting point of the glass, at which the glass is highly viscous. Now the piston 25 of the hydraulic press is lowered and the porous plate 17 pressed down with a suitable force. The effect is shown in Fig. 10. Under the strong pressure the viscous glass is squeezed out from underneath the gauze wires except for a very thin layer which adheres firmly to the wire. The wires of the gauze 15 are themselves pressed a little into the elastic plate 12. For a plate with the elastic properties of steel roughly 0.1 kg./cm. length are needed for obtaining a depression of the order of one wavelength of visible light. For a gauze with 2×400 wires, covering an area of 10×10 cm.$^2$ a force of the order of one ton is needed. By means of this pressure the depression, and therefore the shape of the glass film can be very exactly regulated. In order to ensure that the film takes exactly the shape of the foundation, air or preferably an inert gas is admitted into the furnace, which diffuses through the porous piston—preferably more porous than the foundation plate 12—and presses the film against 12. Finally the oven is cooled down and the gauze with the now firmly attached film is removed. After cooling down, the film assumes a shape which depends on the relative expansion coefficients and also on the relative cross sections and elastic constants of gauze and film. If the expansion coefficient of the film is larger it contracts relatively and assumes a flatter shape, if it is smaller it buckles a little stronger.

In a second operation the base plate 4 of plane polished glass is placed on 12, and the gauze coated with the film as described is placed above it. The oven is heated up, but this time only to a few hundred degrees, sufficient to make "optical contact". Pressure is again exerted, and the wires coated with the thin layer stick firmly to the glass plate, whilst the film in the meshes suffers no considerable deformation and does not stick to the base, as it remains at a slight distance from it, outside the range of the molecular forces. To ensure this it may be advisable not to evacuate the oven completely, but leave a certain reduced pressure, so that a small quantity of air remains imprisoned.

In order to realize shapes as shown in Fig. 4 the temperature in the second operation must be raised higher, until the plate itself becomes a little viscous. It is preferable to make it of somewhat softer glass than the film. After cooling down a shape as shown in Fig. 11 is produced. Here 27 is the base plate. Its expansion coefficient must be correctly matched with that of the film. In order to ensure that at the softening temperature of 27 the film 14 in the meshes remains at a safe distance but after cooling down approaches the base very closely the expansion coefficient of the film is chosen preferably a little larger than that of the base. The differences in the expansion coefficients may be however very small, so that variations of room temperature or heating of film and base together to e. g. a hundred degrees produce only small variations of the gap whereas differential heating produces large variations.

After the operations as described the film may be roughened on the upper side or—especially if it is to be used in a cathode ray tube—coated with conducting or secondary emitting substances 28. These may be preferably fluorescent, to enable focussing of the electron-optical image.

Fig. 12 shows the application of a relay screen according to the invention to television, especially large screen projection. 29 is a cathode ray tube fitted with a relay screen as described above, consisting of the plane base plate 27', and a subdivided film applied at 14' as shown in the previous figure. A large prism 30, which may be filled with a liquid of suitable refractive index is brought into optical contact with 27. 31 is the auxiliary light source, which may be an electric arc. 32 is a lens, which projects a beam of parallel light on the relay screen. The auxiliary light of course can not and need not have exactly zero divergence, care must be taken only that no rays arrive under an incidence angle smaller than the total reflection angle.

If the tube is out of operation the whole of the auxiliary light is absorbed or diffused by the film which closely covers the base. If however an electron beam falls on the screen temperature, differences are produced between the film and the base, and the film "blisters" in the meshes struck by the beam. Partial reflection sets in in these meshes in accordance with the intensity of the electron beam, and they become visible in the reflected light. This image is projected on a projection screen—not shown in the figure—by means of an optical arrangement. The optical system shown in Fig. 12 by way of an example consists of a large lens 33, a smaller dispersing lens 34 and a diaphragm 35. For simplicity only the parallel rays of light are shown, it being of course understood that at least a small divergence is essential for forming images with finite intensity. 33 brings the parallel bundle to a focus, i. e. images the source 31 in the aperture of the diaphragm 35. By this stray light is cut off, and the zero level of illumination reduced. The zero level, i. e. the intensity of reflected light at zero electron beam intensity is caused by a re-diffusion of light in the film, and by reflection on the grid wires. As this is spread over a rather large angle, it may be effectively reduced by this arrangement which utilizes only regular reflection. Further reduction may be effected by using black wires for the gauze, such as oxidized tungsten or nickel-iron.

The large lens 33 need not be optically highly corrected, as every image point is formed only by a rather narrow bundle of light. Therefore, the worst lens errors, viz. spherical aberration, coma and astigmatism will be small. By reason of the refractive index of the film, the screen appears not in its real position, A—B, but in the somewhat tilted position A'—B'. It is advisable to remove lens 33 to a considerable distance from the relay screen. This has the advantage that the image formed by 33, A"—B", will have a smaller tilt. The dispersing lens 34 may be itself arranged parallel to A"—B", in such a way that an undistorted image appears on the projection screen, which may be itself suitably tilted. By the reduction in size of A"—B" the tilt of 34 may be kept small and by this smaller reflection losses and better utilization of the lens aperture are obtained.

Instead of utilizing the reflected light, it is also possible in the case of a diffusing film to use the diffused light emerging from the side from which the electrons fall on the screen. This however means negative modulation, i. e. the picture points appear dark on a bright background. This may be compensated by using a video amplifier with an odd number of stages.

The following example may illustrate the use of the relay screen for television purposes. We assume a screen of 10×8 cm., and a gauze with 40 wires/cm. This gives 400×320=12,800 meshes or picture points. Each element has the dimensions .25×.25 mm.², and we may consider them with good approximation as circular plates of .125 mm., clamped at the edge. For this example we have calculated above that temperature differences of 7.8° respectively 23.5° are needed for full modulation in the case of a plane base respectively in the case of a base with $h$—$L_D$. This is true irrespective of the thickness of the film. The input needed to produce these temperature differences depends however on the thickness of the film, and is directly proportional to it. We assume a thickness of .005 mm., or roughly ten wave lengths. This means that for producing television pictures according to the usual standard of 25 full frames per second, we have to heat up a plate of a volume $8 \times 10 \times 5.10^{-4} = 4.10^{-2}$ cm.³ 25 times per second to a temperature of 7.8 or 23.5°. The heat capacity of glass is about 0.3 gr. cals/° cm.³ or 1.28 watt secs./° cm.³. The input for full modulation will be therefore $7.8 \times 4.10^{-2} \times 1.28 \times 25 = 10$ watts in the first case, 30 watts in the second case. The second case is preferable in spite of the larger input required, as explained above. There is no difficulty to supply 30 watts of peak screen input with television projection tubes of the conventional type. This can be done e. g. with 15,000 volts and 2 milliamps peak current.

In order to evaluate the useful amplification obtainable with the relay screen we must first know the time during which the elements remain open. It can be shown, that after having been rapidly opened by the beam, which delivers its energy in roughly ¼ of a micro second to each element, the heat leaks away through the periphery to the base plate and the "blisters" collapse approximately according to an exponential function with a time constant $$t_0 = .173 \, o.a^2/K \qquad \text{Eq. 5}$$

where $o$ is the specific heat capacity of the film material, $K$ its conductivity, $a$ as before is the radius of the element. The ratio $K/c$ is called the thermal diffusivity, and is for glass about .0057 cm.²/sec. This gives for the above example a time constant of about $0.5 \times 10^{-2}$ seconds, and this may be considered as the time during which the "blisters" remain open. This is about ⅛ of the interval between two successive frames. This is of the right order to produce a "storage" effect, but the ideal time constant is about ½ of said interval. This may be approached by making the film of glass with particularly low thermal conductivity. The time constant is also increased by a coating of fluorescent material, as shown in Fig. 11 which increases the heat capacity but contributes hardly anything to the conductivity. As Fig. 7 shows that the modulating characteristic has a suitable shape up to about 50% transmission or reflection and this persists in the ideal case during about 50% of the time, we see that about 25% of the auxiliary light may be effectively modulated. This allows to evaluate the useful amplification.

We assume that the auxiliary source is an ordinary cinema arc with a total light output of about 50,000 lumens, of which by means of a suitable optical arrangement 20,000 lumens may irradiate the relay screen. If all invisible light is filtered out by means of filters, this is equivalent to about 100 watts. This is considerably more than the electronic input, therefore a diffusing film must be used. Of the 20,000 lumens about 25% or 5000 lumens may be modulated, and of this, assuming 40% reflection losses in the optical system between relay screen and projection screen 3000 lumens arrive at the projection screen. This may be compared with the screen illumination obtainable if the 30 watts electronic input had been directly utilized for producing fluorescence on the screen of the cathode ray tube. Assuming 10 lumens/watt in the screen and 50% losses in the projection system—both rather favorable assumptions—we obtain 150 lumens. The useful amplification factor in this case is therefore at least 3000:150=20.

Whereas in the relays as described so far the absorption of the auxiliary light reduces the obtainable amplification, this same effect is turned into an advantage in the device shown in Fig. 13. In this figure 36 is the base plate, which bears on its surface a regular pattern of depressions of a depth $h$ of the order of one wave length. 37 is a thin film, e. g. of glass, which is slightly dished in the parts above the depressions of the base to a depth $z_0$, and is fused to the projecting parts 39 of the base. If the device is not in operation, i. e. if there is no temperature difference between film and base, the gaps $x$ between them are of the order of one wave length.

This device may be manufactured in various ways, one of which is as follows. An "offset" plate with a pattern as shown in Fig. 14 is made and by means of rubber roll printing this pattern is transferred on the base plate, so that the shaded area 39 is covered with a greasy substance, the areas 40 remaining free. The glass plate is now etched in fluorine gas, with a controlled amount of water vapour content, until the depressions are about one wave length deep. This process may produce depressions of more or less uniform depth in every one of the depressions. This is a considerable advantage as compared with gradual depresssions, as shown in Fig. 13, as it reduces the zero level of illumination which is mostly caused by the peripheral parts, which contribute only little to the modulation.

Another process for manufacturing the base plate is as follows. From the printing block a matrix is produced by galvanoplastics in some hard metal which does not easily wet softened glass. This is placed on top of a glass plate in the vacuum furnace shown in Fig. 9, and used for moulding the plate at a suitable temperature, at a not too high pressure. If the matrix adheres to the glass, it may be removed by dissolving it in an acid. This process may produce also shapes as shown in Fig. 13, with gradually deepening depressions.

The final operation is the same in both cases. A plane glass film is placed in top of the prepared base plate, and pressure exerted at a suitable temperature for making optical contact. The film adheres firmly to the projecting parts 38 under the influence of the molecular forces, and can be no more separated from it without destroying it. After cooling down, the final shape of the film depends again on the relative expansion coefficient of film and base. If its expansion coefficient is smaller than that of the base, it assumes the shape as shown in Fig. 13. If it is larger, it will remain tightly stretched in a plane initial position.

The operation of the relay screen as shown in Fig. 13 is as follows. In the absence of primary radiation the gaps are wide. Most of the auxiliary radiation is reflected, only a little is absorbed or diffused at or near the contacting areas of base and film. If now primary radiation falls on the film, it will buckle towards the base. By this the gap decreases and with it decreases the reflection, whereas the absorbed or diffused fraction increases. This device has therefore negative modulation in the reflected light, positive modulation in the diffused light. There is moreover an important difference as compared with the devices as shown in Figs. 8 and 11, that absorption of auxiliary light increases the sensitivity. As the gap decreases, more and more auxiliary light is absorbed and this produces an additional movement towards the base. Conditions may be found in which this reaction or "feedback" effect produces a very considerable amplification of the primary movement.

This effect may be better understood with reference to Fig. 15. In this graph the abscissa is the gap $x$ at the center of a circular element measured in wave lengths as units. The ordinate $DS/S$ is the relative dilatation of the film area $S$, where $\Delta S$ is measured from the stress-free state of the film as zero. On the one hand this quantity is a geometrical function of the deformation of the film. For rigidly clamped films it is given by the following equation.

$$\Delta S/S = 2C(z^2 - z_0^2)/a^2 \qquad \text{Eq. 6}$$

Here $z$ is the distance of the lower face of the film 37 in Fig. 13 from the plane of the projecting areas 38, i. e. $z = h - x$ where $h$ is the depth of the depressions and $x$ is the gap at the centre. $C$ is the same numerical constant as in Eq. 4 (about 3.25 for rigidly clamped films). This equation represents a parabola, which has its lowest point at $x = h$ and passes through zero at the stress-free points, $z_0$ to the right and left of the point $x = h$.

On the other hand the relative dilatation $\Delta S/S$ is equal to $2\alpha\Delta T$, where $\alpha$ is the linear expansion coefficient of the film, and $\Delta T$ its average temperature difference against the base. In the absence of primary radiation this difference will be caused by absorption of the auxiliary radiation. It will be obviously proportional to the intensity of the radiation and will be also a function of the gap. It can be shown that this function may be represented by an "effective absorption coefficient," $t_{eff}$, which is a little different from the average absorption coefficient shown in Fig. 5, for the following reason. If the gap increases, the peripheral parts of the film still continue to absorb radiation. But this is less effective in producing temperature differences between film and base than radiation absorbed nearer the centre, as the heat developed near the periphery leaks away rapidly. Therefore the effective absorption coefficient $t_{eff}$ drops away more rapidly for larger gaps than $t$. If we draw the $t_{eff}$ curve on the right scale—proportional to the intensity of the auxiliary radiation—it represents the thermal dilatation, and this must be equal to the dilatation as a geometrical function of the gap, as represented by the parabola. We obtain therefore the equilibrium point P by the intersection of the two curves.

If now primary radiation falls on the film and produces a certain additional temperature and dilatation, we must shift the $t_{eff}$ curve upwards by a corresponding amount. It is however easier to draw the $t_{eff}$ curve only once, and shift the parabola downwards. This has been done in Fig. 15. It can be seen that by reason of the acute intersection angle of the two curves a comparatively large shift is produced, from P to P'. If the temperature difference caused by the primaries is $\Delta T_p$, the resulting shift $\Delta T_r$ is about 1.8 times larger. This factor of 1.8 represents the gain in sensitivity due to the reaction.

We could survey all possibilities by drawing the $t_{eff}$ curve on all possible scales, corresponding to all possible auxiliary radiation intensities, and investigate its intersection with all possible parabolas. It is however preferable to draw the $t_{eff}$ curve only once, and vary only the parabola. We can see immediately, that parabolas as shown in Fig. 15 do not give very great amplification factors. In order to obtain high amplifications the parabola must follow the $t_{eff}$ curve as closely as possible, so that any small shift of the parabola produces a large shift of the equilibrium point P. This can be done only if there is no real $z_0$, i. e. if $z^2_0 < 0$, and the parabola never cuts the zero axis. This means that there is no stress-free state in other words, the film must have a certain tension even when it is in the plane state. This can be easily realized by giving the film a somewhat larger expansion coefficient than the base.

A diagram corresponding to such an initially stretched film is shown in Fig. 16. Here the $\Delta S/S$ parabola follows the $t_{eff}$ curve very closely. This means that the film is almost in equilibrium in any position. If it approaches the base, the increased heating by absorbed auxiliary radiation is sufficient to maintain it in the stretched position. A very small addition of primary radiation is sufficient to upset this equilibrium considerably. This sensitive state can be always obtained with an initially stretched film, if the intensity of the auxiliary radiation is adjusted to a sufficiently high value. If the intensity is further increased, the film becomes unstable.

This arrangement has however the drawback, that the plane initial state is semistable, the film could just as well buckle inwards as outwards. This ambiguity can be easily overcome by applying a suitable gas pressure on the outside of the film. It can be shown that the relative stretching $\Delta S_p/S$, which is produced by a pressure $p$ is inversely proportional to the distance $z$ of the film from the original plane, at which equilibrium is established. Therefore if the pressure $p$ is acting alone, we can find the equilibrium by the intersection of a hyperbola, const/$z$, with the $\Delta S/S$-curve. Instead we can also add the negative value of the pressure-hyperbola—shown in Fig. 16 in dotted lines—to $\Delta S/S$, and find the intersection of the resulting curve—shown in Fig. 16 in point-dotted lines—with the zero line. This gives the equilibrium depression $z_{op}$, for the gas pressure acting alone. If now primary radiation is added, equilibrium is established in the point Q instead of in P. As the resistance of a dished film against pressure increases rapidly, the general shape of the resulting characteristic changes only little, but the initial point Q is well defined and there is no danger of the film ever buckling outwards, as it would have to go over the plane state, in which a film cannot resist even the slightest amount of external pressure.

Relay screens of the kind last described, with positive reaction and very high amplification factors are therefore particularly suitable not so much for cathode ray tubes, in which the vacuum is practically perfect, but for image converters, which operate in open air, or at a suitable reduced pressure. They are also suitable for indicating mechanical forces, e. g. as recorders of sound or for forming acoustical images with very short sound waves, especially in under-water devices.

Relay screens of the type as shown in Fig. 13 have however certain advantages also in cathode ray tubes. In relay screens as shown in Fig. 11 the electric charges produced by the electrons on the film always try to reduce the gap, i. e. their effect has a sign opposite to that of the heat effect. In screens according to Fig. 13 however both effects have the same sign. It is therefore not necessary to remove every trace of charges, unless their accumulation disturbs the focusing of the electrons, or prevents them from reaching the screen altogether. The potentials produced by the charges are inversely proportional to the electric capacity of the film elements. If therefore the capacity of the arrangement can be made high enough, it is possible to increase the sensitivity of the relay screen considerably. In this case it is necessary to make the base of semi-conducting material, or coat it at least superficially with a semi-conductor.

Fig. 17 shows the application of relay screens according to the invention to image converters, especially for converting images produced e. g. by infra-red radiation into visible images. This apparatus may be used e. g. for vision through mist or fog. Similar devices may be used however also as self-contained image intensifiers for projection television, which can be used in conjunction with ordinary cathode ray tubes. The apparatus as shown in Fig. 17 provides an example of the application of the above explained principle of internal reaction, and how it can be supplemented by external optical feed-back arrangements.

41 is an objective lens system for producing a primary image of the object to be seen or studied on a relay screen 43, which is supposed to be of the type as shown in Fig. 13. In the case of long-wave infra-red radiation the lenses may be made of rock salt, whereas the film may be made of dark, but not perfectly opaque diffusing or roughened glass, so that the amplified positive image may be observed from the back of the screen, though the observation window 44.

The relay screen 43 is fixed on and in optical contact with a rectangular glass prism 45, the hypothenuse of which is irradiated with approximately parallel light coming, through the mirror 46 and the lens 47, from the auxiliary light source 48, which may be a high intensity high pressure mercury arc between tungsten electrodes.

By the effects explained above a negative, intensified image is produced in the light reflected from the relay screen 43. This is imaged by the lens 49, on a second relay screen 50, which is of the same type as 43. Screen 50 is irradiated with auxiliary light from the same source 48 through the mirror 51 and the lens 52. In the light reflected from 50 a second intensified positive image is formed. This is again imaged on 43 by the lens 49, and reintensifies the primary image. A part of this light diffuses through the film of the relay 43 and—jointly with the light falling in from the other side face of the prism—makes it visible. A small fraction of the light intensities inside the optical system is sufficient to make the image visible, the greater part of the energy is needed only to produce the necessary temperature differences and movements.

The whole optical system is enclosed in a square box 53. If high sensitivity is needed the intensity of the source must be regulated to a critical value. The relative values of the intensities emitted through the lenses 47 and 52 from the source 48 may be regulated e. g. with dark glasses or rotating sectors. Obviously the sensitivity of this arrangement is limited only by the accuracy with which the relay elements can be made equal and the illumination can be kept constant. The luminous efficiency of the light source 48 need not be high, if only most of the radiation is transmitted by the prisms and lenses without much absorption.

The fundamental optical process which underlies the invention is considerably chromatic, i. e. dependent on the wave length of the auxiliary light. This means that if white light is used for illumination, the half-tones will be violet or blueish in reflected light, and reddish in the transmitted—diffused—light. This is of little importance in the case of infra red image converters, but may be disturbing in projection television. The effect may be eliminated or reduced according to the invention in two ways.

One way is to let light of different wave lengths fall on the screen under different incidence angles, red light under a more grazing, violet under a more nearly normal angle so that the quantity $\alpha$ in Eq. 2 remains substantially constant. This may be effected by spectroscopical decomposition of the auxiliary light, e. g. by prisms or by using several light sources of different color slightly spaced from one another, and so matched that their mixture produces white light.

Another way is to use a fluorescent projection screen, which produces—as most fluorescent substances do—exactly or approximately the same spectrum whether it is excited by long ultraviolet or by any kind of visible radiation. This gives a strong background of the same color—preferably white—on which the chromatic differences become less conspicuous. In order to eliminate chromatic differences altogether it may be preferable to use only ultraviolet—e. g. the very strong mercury line at 3650 Angstrom, as auxiliary light, and convert it into visible light only at the screen. This gives also the advantage of higher sensitivity of the relay screen, as smaller movements are needed for modulating shorter wave lengths.

A relay screen composed of linear elements instead of picture points has certain advantages. An example of such a screen is shown in Fig. 18. In this figure, 61 is the base plate which is fitted with a number of closely ruled shallow grooves 62, preferably fluted, separated by flat ledges 63. The base plate is covered with a thin film 64, which is in optical, mechanical and thermal contact with the base only at the ledges 63. The film is slightly undulated, so that it follows approximately the shape of the grooves. In thermal equilibrium the separation in the center line, $x$, is of the order of one wave length.

This device operates in the same way as the screen described in connection with Figs. 13 and 14. It has, however, certain advantages as regards sensitivity, efficiency, and manufacture. Comparing a groove of a certain width with a circular element of the same diameter, all other factors being equal, the temperature difference necessary to produce a certain movement is reduced by about 25%. Moreover, the time constant—relaxation time—is more than doubled, i. e. after having absorbed a certain quantity of heat, an elongated element returns to its equilibrium position after more than twice the time required by a circular element. This can be easily understood, as for a given area the cross section through which the heat can leak away towards the base plate is only about half as large. The "definition," i. e. the spacing of two picture points which can be considered as independent is much the same in both cases. A further advantage is that the inactive area, i. e. the area of permanent contact between film and base can be made smaller. For all these reasons, a given amount of primary radiation can modulate a larger proportion of the auxiliary radiation.

In the case of application for television purposes it is advantageous to place the grooves at right angles to the picture lines. This gives the additional advantage that correct operation does not depend on the exact coincidence of picture lines and screen lines.

Screens with parallel ruled grooves, especially flutes, also offer certain advantages in manufacture. In addition to the methods described in the original application—etching and moulding—fluted screens may be made by grinding with a wheel of a suitable diameter. The wheel may be a hardened steel cylinder with a suitable polish, such as French chalk or rouge.

Fig. 19 shows a method for applying the film to the base plate. 65 is a roller, with a radius slightly larger than the curvature radius of the flutes. All parts may be placed in a vacuum furnace similar to that described in Fig. 9 and heated to a temperature sufficient for establishing "optical contact." When this temperature is reached, the roller 65 is slowly moved under suitable pressure across the base plate 61. The film 64 adheres to the ledges 63 by molecular forces, whereas the free part of the film remains at a distance from the bottom of the flutes determined by the difference of the radii of the flutes and of the roller.

Fig. 20 illustrates certain other improvements on relay screens according to the invention. Whereas in all examples described above the illumination took place through a large rectangular prism, this may be done also, as shown in Fig. 20, by means of a transparent plate 66, fitted with prismatic ridges 67, backing the base plate 61. In order to obtain homogeneous illumination, it is preferable to use prisms 67 of small dimensions as compared with the thickness of the plate 66. The edges of the prisms have to be as sharp as possible in order to reduce the lens effect of the roundings.

This arrangement is less suited for observing the screen from the back, and is preferably used in connection with films viewed from the front side, and in connection with screens of the type shown in Fig. 13 or in Fig. 18. As explained above, screens of this type produce a negative image in reflected light but a positive picture in the transmitted—diffused—light. It is important in this case to reduce the zero level of illumination, which arises from the fact that at the areas of the film which are in permanent contact with the base plate there is continuous transmission of light. This may be overcome as follows. The film is coated with a photographic emulsion and exposed to auxiliary light in the absence of primary radiation. In consequence the emulsion will be exposed to light only at the areas of permanent contact. After developing and fixing these areas will be covered with a layer of silver 68, which stops the radiation and adjusts the zero level to zero or to a convenient small value. If used in cathode ray tubes, the silver film forms a grid or network which presents accumulation of electronic charges.

The film can be made of transparent glass and may be made diffusing very simply and conveniently by coating it with a grainy transparent material 69 with a suitable binder to establish optical contact between the grains and the film. In the case of cathode ray tubes, this is preferably a fluorescent powder. It has been found that this coating can be made easily of such thickness as to emit most of the diffused light at right angles to the surface.

Fig. 21 shows a cathode ray tube 70 fitted with a screen according to Fig. 20, placed at 45° to the main beam direction. 71 is a light source of high intrinsic brilliancy, such as an arc lamp. 72 is a condensing lens, which produces an approximately parallel bundle of light. The relay screen is imaged through the projector lens 73 on the projector screen in the light diffused by the film or its coating. This arrangement has the advantage—as compared with the one described in Fig. 12—that ordinary projection systems may be used, as the light emission of the film is mainly at right angles to its surface.

What I claim as new and desire to secure by Letters Patent of the United States is:

1. Apparatus for controlling light radiations of a given type in accordance with radiations of a second type comprising a base member which is transparent to the first-named radiations and adapted to reflect such radiations by internal reflection at a particular surface of the member, a unitary, thermally expansible film positioned normally in optical contact with the said surface and having a portion the spacing of which with respect to the surface varies in accordance with the degree of thermal expansion of the film, said film being of diffusive character with respect to said first-named radiations and being absorptive with respect to radiations of said second type, and means for directing radiations of the second type against the said film to vary its thermal expansion by the heat generated through absorption of such radiations and by thus changing the spacing of the said portion with respect to the base member to modify the reflectivity of the latter with respect to said first-named radiations.

2. A light relay comprising a transparent base member adapted to reflect light by internal reflection at a particular surface of the member and a thin light diffusing film normally in optical contact with the said surface of the base member and fixedly secured thereto at a large number of displaced points, the film being of thermally expansible character and being capable of slight displacement from the base member at regions where it is not fixedly secured to the member, whereby expansive deformation of the film produced by impingement of heat-generating radiations thereon may vary the local spacing of the film and base member and thus modify locally the light reflecting characteristics of the said surface of the base member.

3. A light relay comprising a transparent base member adapted to reflect light by internal reflection at a particular surface of the member and a continuous thermally expansible film of light-diffusing material applied to the said surface of the base member, the said film being fixedly secured to the base member at a large number of approximately regularly spaced intervals and being otherwise free for displacement from the base member whereby localized expansive deformation of the film produced by impingement of heat-generating radiations thereon may vary the spacing of the film and base member and thus modify locally the light reflecting characteristics of the said surface of the base member.

4. A light relay comprising a transparent base member adapted to reflect light by internal reflection at a particular surface of the member, said surface being of generally planar character except for the provision of a great number of regularly spaced areas which depart from the principal plane of the surface by an amount on the order of the wave length of said light, and a continuous thermally expansible film of light-diffusing character affixed to the surface of the base member, said film being displaceable from the base member in regions overlying the said regularly spaced areas and being capable of being so displaced by thermal expansion effects whereby the reflecting properties of the said surface of the base member may be varied in accordance with the impingement of heat-generating radiations on the said film.

5. A light relay comprising a transparent base member adapted to reflect light by internal reflection at a particular surface of the member, said surface having a large number of microscopically depressed areas at regular intervals thereon and a thin film of light diffusing material applied to the said surface of the base member and fixedly secured thereto at points between the said depressed areas, the said film being thermally expansible so that its degree of conformity to the said depressed areas may be varied in response to expansive distortion produced by the impingement of heat-generating radiations thereon, whereby the light-reflecting properties of the said surface of the base member may be varied locally in accordance with such radiations.

6. A light relay comprising a base member adapted to reflect light by internal reflection at a particular surface of the member, there being a large number of parallel rectilinear depressions in the said surface and a thin film of light-diffusing character applied to such surface and fixedly secured thereto at regions between the said depressions, the said film being thermally expansible so that its degree of conformity to the said depressions may be changed in response to expansive distortion produced by the impingement of heat-generating radiations thereon, whereby the light-reflecting properties of the said surface of the base member may be varied in accordance with such radiations.

7. A relay according to claim 6 in which the surface of the said base member opposite the surface which bears the said depressions is provided with a large number of prismatic ridges which are parallel to the said depressions.

8. Apparatus for controlling light radiations comprising a base member which is transparent to such radiations and adapted to reflect such radiations by internal reflection at a particular surface of the member, a thermally expansible film positioned normally in optical contact with the said surface and having a portion the spacing of which with respect to the surface varies in accordance with the degree of thermal expansion of the film, said film being of diffusive character with respect to said light radiations, and means for applying variable amounts of heat to the said film to vary its thermal expansion and by thus changing the spacing of the said portion from the base member to modify the reflectivity of the latter with respect to the said light radiations.

DENNIS GABOR.